Jan. 23, 1940.  E. J. WINKLEMAN  2,187,924
FLEXIBLE HANGER
Filed July 29, 1937     3 Sheets-Sheet 1
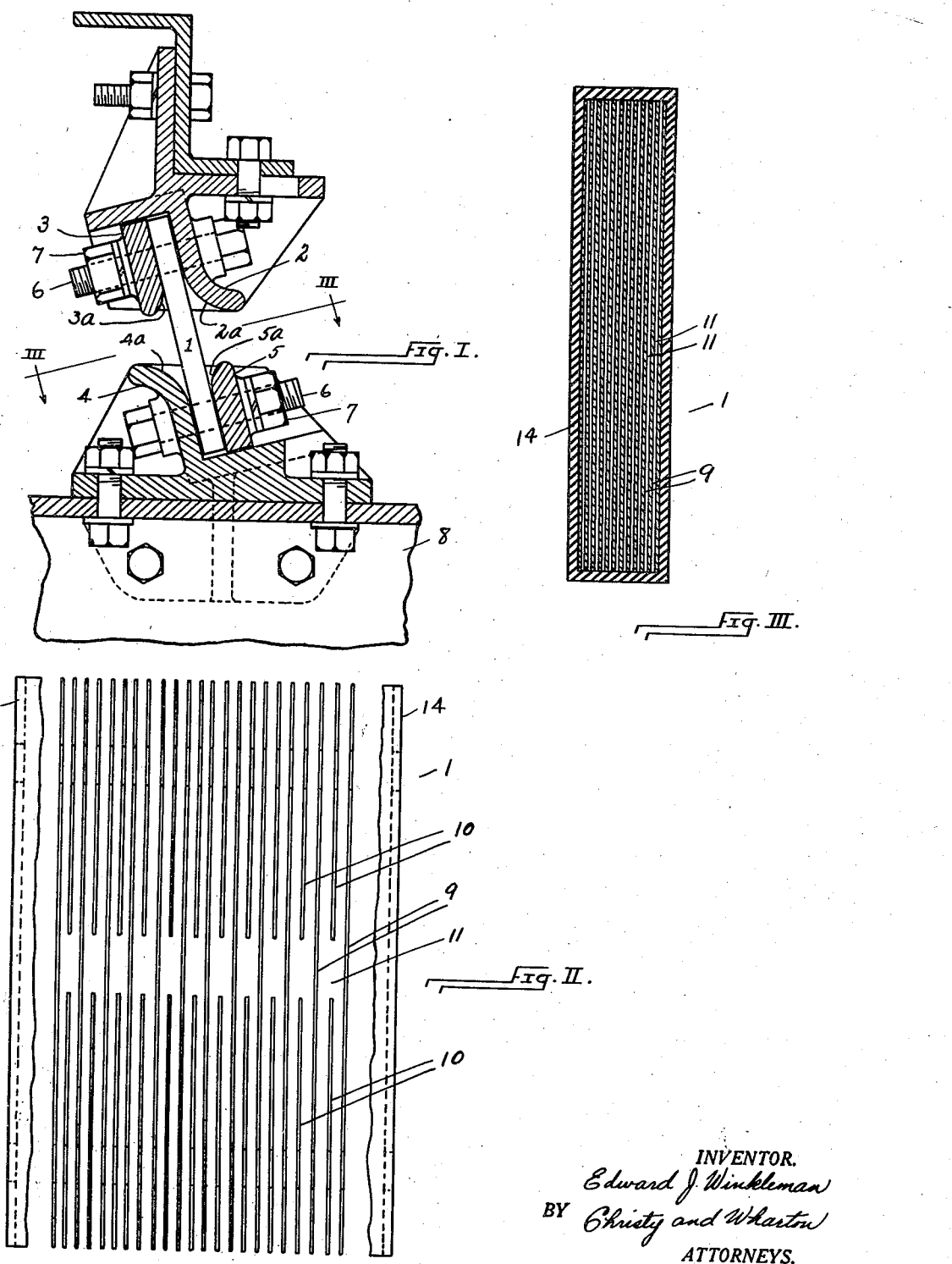
INVENTOR.
Edward J. Winkleman
BY Christy and Wharton
ATTORNEYS.

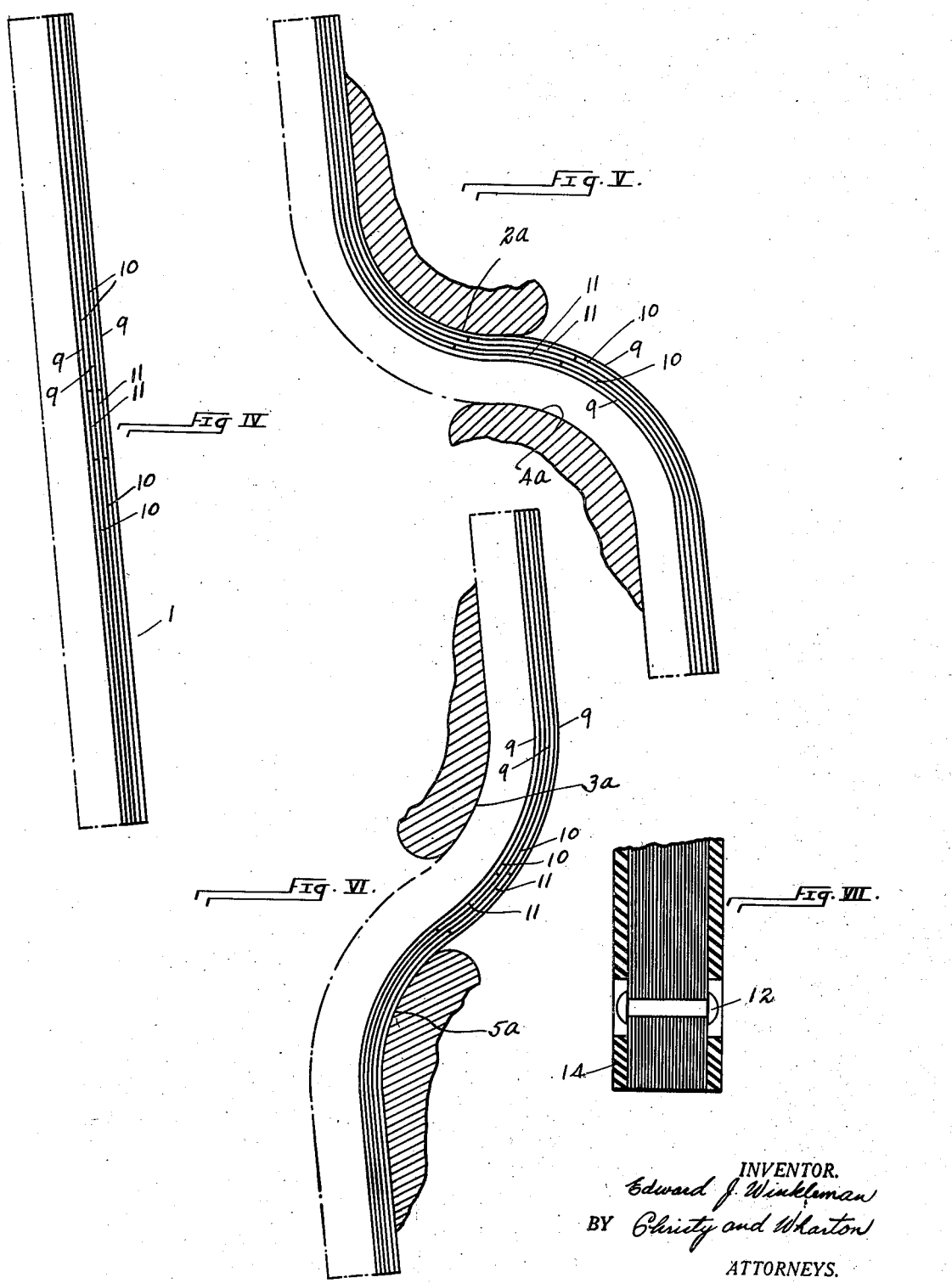

Jan. 23, 1940. E. J. WINKLEMAN 2,187,924
FLEXIBLE HANGER
Filed July 29, 1937 3 Sheets-Sheet 3
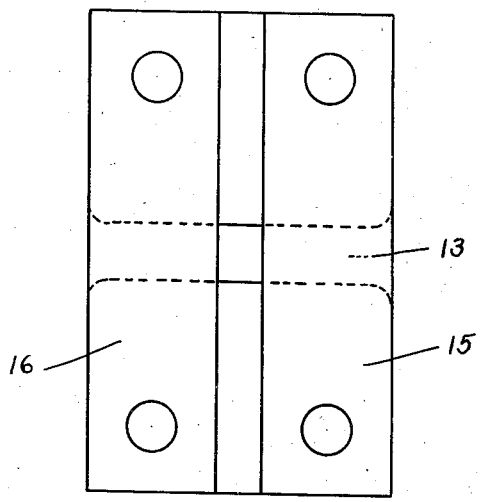
Fig. VIII.
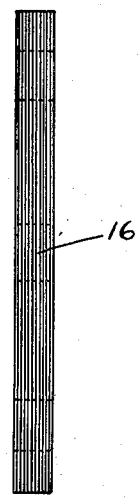
Fig. IX.
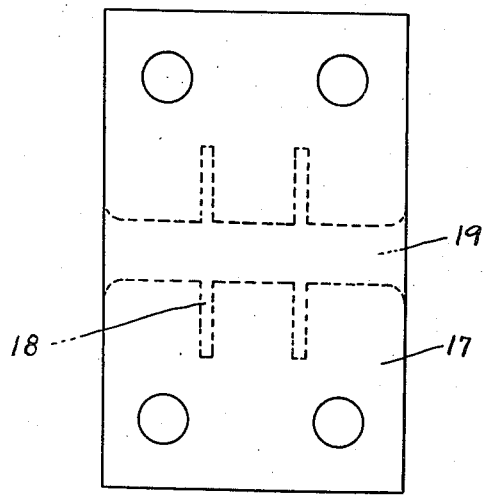
Fig. X.
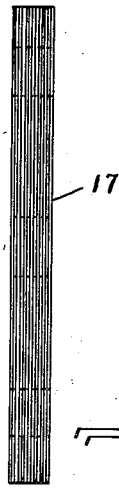
Fig. XI.
INVENTOR.
Edward J. Winkleman
BY Christy and Wharton
ATTORNEYS.

Patented Jan. 23, 1940

2,187,924

UNITED STATES PATENT OFFICE 2,187,924

FLEXIBLE HANGER

Edward J. Winkleman, Oakmont, Pa., assignor of forty-nine per cent to Duquesne Slag Products Company, a corporation of Pennsylvania Application July 29, 1937, Serial No. 156,322

3 Claims. (Cl. 287—85)

This invention relates to a novel hanger.

The hanger of my invention finds utility in the suspension of screen and classifier decks, counterweights, and generally in the suspension, or otherwise arranged support, of bodies which are subjected to relatively rapid reciprocation.

By suspension of reciprocatory bodies by means of hangers which are relatively short and stout, but which are flexible in service, movement of a suspended body is obtained which differs usefully from movements obtainable by mounting means of any other type. Hangers so used do, however, tend rapidly to deteriorate because of the internal friction and heating produced by the rapidly recurrent form changes which a flexible hanger is caused to assume in supporting a reciprocating body which is subjected to rapid reciprocatory movement. The conditions of hanger service are particularly severe when a flexible hanger is incorporated in assemblies so organized that a contact surface is opposed to movement of the hanger, to control hanger flexion, during reciprocation of a body supported by the hanger. This is so because such organization imposes upon the strap flexion about a plurality of artificially imposed radii, some of which may be relatively short, thus causing high internal friction within the body of the hanger. This is particularly the case if movement is so imparted to the suspended body that a tendency for the flexible hanger to buckle during reciprocation of the supported body is created.

It has been possible somewhat to ameliorate internal conditions within a flexible hanger of strap form by laminating the hanger, rather than using a single body of metal, rubber, or other resilient material. In such hangers there is, however, friction between laminae, and the destructive effects of a buckling tendency in use of the hanger are not avoided. As they have previously been made, laminated hangers have not been susceptible of satisfactory lubrication, to decrease friction between laminae, because adequate space for the accommodation of lubricant does not exist within the hanger, and because the lubricant, by accumulating regionally, tends to deform the hanger.

The objects of my invention are to provide a flexible laminated hanger so constructed that, without corresponding loss of body, the flexibility of the hanger is increased in an appropriate hanger region, or regions; so constructed that friction between laminae of the hanger is decreased; and so constructed that effective hanger lubrication is maintained throughout long periods of service.

More generally stated, it is the object of my invention to provide a flexible hanger which is capable of long continued use under severe conditions.

In the accompanying drawings, Fig. I is a vertical sectional view of a hanger mounting of the type to which reference has been above made as subjecting the strap to service of particularly great severity, and showing my flexible hanger mounted therein.

Fig. II is a view of my novel hanger, showing the hanger elements separated from each other in the manner of an "exploded" view.

Fig. III is a fragmentary cross-sectional view taken through the hanger on the plane of the section line III—III of Fig. I, but showing the hanger on an enlarged scale.

Fig. IV is a fragmentary detail view showing the relative position of the hanger laminae in an unflexed condition of the strap.

Fig. V is a fragmentary detail elevational view, showing the relative position of the hanger laminae in severe flexion of the hanger about an opposed contact surface in forward movement of a body suspended by the hanger.

Fig. VI is a fragmentary detail view similar to Fig. V, but showing a flexion of the hanger which occurs in rearward movement of a body suspended by the hanger.

Fig. VII is a fragmentary detail view in vertical section, showing the manner in which the hanger laminae are tied together to form an integral hanger structure.

Fig. VIII is an elevational view of my novel hanger, showing a structural modification in certain of the hanger laminae.

Fig. IX is a vertical edge elevation of the modified form of hanger shown in Fig. VIII.

Fig. X is an elevational view of my novel hanger showing another modification in the structure of certain hanger laminae.

Fig. XI is a vertical edge elevation of the modified form of hanger shown in Fig. X.

Referring to Fig. I of the drawings, a flexible, strap-form, hanger is designated generally by reference numeral 1, and is there shown as mounted in an association in which its novel qualities are of particularly great advantage. This mounting includes clamping members 2 and 3 arranged to engage the hanger adjacent its upper terminal, and clamping members 4 and 5 engaging the hanger adjacent its lower terminal. Of these clamping members, the members 2 and 4 are shown fixed, and the members 3 and 5 are shown as movable toward and from the fixed members. At both ends of the hanger, the clamping action is provided by bolts 6 and nuts 7.

It will be noted that all the clamping members are provided with contact surfaces curved along and away from the opposed hanger face. Of these contact surfaces, the surfaces 2a and 4a, presented by the members 2 and 4, are of greater length than the contact surfaces 3a and 5a which the members 3 and 5 oppose to the forward and rearward faces of the hanger. Assuming that a body suspended by the hanger, such body being fragmentarily shown in Fig. I and designated by reference numeral 8, is reciprocated in a primarily arcuate path; the flexion of the hanger, and the path followed by the suspended body, are controlled by regional contact of the hanger with the contact surfaces opposed to it. If the suspended body be forced forwardly, the flexible hanger 1 will be contacted by the contact surfaces 2a and 4a, which will produce in it a severe flexion, such as that shown in Fig. V of the drawings, causing an abrupt vertical component in the path of movement of the suspended body. In the rearward movement, after the hanger has passed through its intermediate, or "neutral" position, it is contacted by the surfaces 3a and 5a which impose upon it a reversed flexion, such as that shown in Fig. VI of the drawings.

It will be apparent that this flexion itself about artificially imposed centers necessarily subjects the hanger to high internal friction. If the hanger be laminated, the laminae tend to rub against each other. There is also a tendency for the strap to buckle; that is, for the hanger locally to bulge, or to fail wholly to follow the flexion shape sought to be imposed on it. The buckling tendency acts greatly to accelerate failure of the hanger in service. My invention serves, to a great extent, to counteract the tendencies which lead to rapid deterioration, and early failure, of a hanger of this sort. As will be seen in the drawings, the hanger is primarily made of laminae of two different sorts.

Primarily my invention consists in forming some of the laminae of a flexible laminated hanger of two or more pieces, and by spacing the adjacent edges of these pieces, to provide space for lubricant and regionally to increase the flexibility of the hanger. In Figs. II to VI inclusive of the drawings, the hanger, which is shown as of strap form, has laminae 9, which are the full length of the hanger, and laminae 10 which are each formed of two pieces spaced from each other to leave an interval 11 between their adjacent edges. As shown in these figures of the drawings, the hanger has complete, one-piece laminae 10 on both of its faces, and within these exterior members one-piece laminae and divided laminae alternate.

As the hanger is shown, the laminations are bound together adjacent the ends of the hanger by rivets 12, which bind in the pieces of the two-piece laminae 10, as well as the continuous laminae 9. In order to prevent the entry of dust into the strap, it may desirably be enclosed in an envelope 14 of rubber, or the like, which surrounds all sides of the strap proper. If the laminae are closely held to each other, as shown, it is unnecessary for any conditions of use to enclose the ends of the strap.

Functionally to consider one advantage of my novel hanger, it will be obvious that the flexibility of the hanger, in the regions where greatest flexion is desirable, is obtained by regionally decreasing the rigidity of the hanger. While for the purpose illustrated, the two-piece laminae of the hanger are shown spaced from each other in a central region across the strap, the region of increased flexibility may be provided in any region across the hanger which may be desirable in assisting any particular flexion of the hanger. Also, if desired the laminae which are formed of a plurality of pieces may be made of three or more pieces spaced from each other to leave regions of increased flexibility across the hanger. It is to be understood that, in this latter case, an additional set, or sets, of bolts or rivets must be used to bind into the hanger assembly this additional tier or tiers of pieces.

The number of laminations forming the strap may thus be great, although I have for purpose of clarity illustrated the hanger as composed of but relatively few laminae. I have found it desirable to use in classifiers and screens designed for heavy work as many as twenty-two complete laminae and twenty-one interrupted laminae. The number of laminae may be increased almost indefinitely in adaptation of my hanger to particularly exacting service conditions. Generally considered, my flexible hanger combines the advantages of a stiff and heavy strap with those of a relatively flexible hanger.

In assembling my hanger, the several laminae going to make up the hanger are first painted with a suitable lubricant, such as a suspension of graphite in lubricating oil, and the laminae are then stacked, and bound together. Desirably a relatively high pressure is used to force the laminae of the hanger into complete surface contact with each other. Any surplus lubricant, forced to the transverse central region of the strap under pressure, or in service, is accommodated in the spaces 11 and thus does not tend so to collect between laminae as to bulge them outwardly.

Referring particularly to Figs. IV, V and VI of the drawings, there is illustrated the manner in which my novel hanger adapts itself to the exigencies of a severe service, such as that which has been described. Upon inspection of these figures of the drawings, and by comparison of Figs. V and VI with Fig. IV, it will be seen that in reciprocation of the suspended body the several laminae of the hanger are all flexed about radii of different length, and that this difference is substantial between laminae lying adjacent the opposite contact faces of the hanger. The spacing in alternate laminae permits them to accommodate themselves to flexion about the different radii, by appropriate widening of the gap between the separated pieces of each interrupted lamina during flexion. Also the gaps, or spaces, 11 between the pieces of each interrupted lamina permit adjacent complete laminae to bulge very slightly within the body of the hanger, thus forestalling localized bulging of the hanger.

The foregoing describes the action as the hanger is severely flexed in movement of a body suspended by it, the internal structure of the hanger tending to permit a smoothly progressive restoration to normal arrangement of the laminae without an extreme tendency for the hanger to buckle.

It is to be understood that my novel hanger structure greatly increases the life of a flexible hanger under any conditions of service. In comparison with flexible hangers of previously known structure, the greatest comparative increase in the life of the hanger is naturally obtained in those hangers which are subjected to unusually severe service conditions. An increase in hanger life is, however, experienced in any use in which a flexible hanger carrying a reciprocated body is itself subjected to flexion. In order to obtain maximum hanger life under service conditions in which a hanger is flexed about one or more opposed contact surfaces, it is desirable to combine my novel hanger herein described with the hanger mounting disclosed in my co-pending application Serial No. 156,321, filed July 29, 1937.

While steel of the best spring grade is the most desirable material for my hanger, I do not limit myself to the use of it, or any other, particular material. The effect of the novelty involved in the assembly of my hanger will be obtained by the use of any material, or combination of materials, having appropriate qualities. Thus under certain conditions, and for certain purposes, I may employ metals other than steel for all the strap laminae, or for the laminae of one sort going to make up the hanger. Similarly I may use a rubber, or rubber-like material, or compositions having resiliency and the necessary functional complement of structural strength.

While I have described the hanger of my invention used as a "suspension" hanger, in which use it has outstanding utility, it may be used in the reciprocatory support of a body the reciprocation of which involves flexion of hangers used as resilient columns.

It is a matter of convenience to preform the flexible laminated hanger as a unitary assembly of laminae, held closely together, prior to mounting the hanger. It is possible, however, initially to assemble the hanger laminae on the clamping bolt of the hanger mounting assembly, and by the clamping action used in mounting the hanger to hold the laminae closely together.

Certain specific modifications in my flexible laminated hanger are illustrated in Figs. VIII to XI inclusive of the drawings. In Figs. VIII and IX there is shown a laminated hanger in which laminae 13 correspond closely to the laminae 10 shown in the preceding figures of the drawings, comprising two pieces which have their adjacent edges spaced to provide in alternate laminae throughout the thickness of the hanger spaces 14 which provide a region of increased flexibility across the hanger. Other laminae 15 are divided, and the pieces are arranged and spaced to provide spaces 16 forming a band of increased flexibility extended longitudinally of the hanger.

This structure not only gives relief in flexion of the hanger transversely to its axis, but also gives relief in flexion of the hanger parallel to its axis. That is, torsional effects resulting from imperfect hanger mounting, imperfect placing or formation of the contact surfaces, or lack of alignment in the forces which reciprocate the body supported by the hanger, lead to a twisting of the hanger about, or approximately parallel to its longitudinal axis. Under such circumstances relative creeping of the pieces of the laminae 15, under the influence of such torsion, tends to relieve the hanger of the worst effects of the distortion. Also, the spaces 16, between the pieces of the laminae 15, provide increased accommodation for lubricant, and an accommodation provided by the spaces 14.

In the modification shown in Figs. X and XI, the two pieces of laminae 17 are generally similar to the laminae 10 and the laminae 13, shown in preceding figures of the drawings. They are, however, provided with longitudinal slots 18 extended from the space 19 between the pieces of the lamina. This arrangement combines with increased flexibility, and relief for, normal hanger flexion some accommodation to torsional flexion. It also provides longitudinal passages for accommodating lubricant extended partway of the hanger length.

Combinations of these special modifications will readily occur. Thus, the pieces of the laminae 15 of Figs. VIII and IX may be horizontally slotted in the same manner that the pieces of the laminae are longitudinally slotted, or the hanger may be made up of laminae 15 and 17 to provide a maximum relief under torsion.

Various other modifications may be made in the materials and arrangement going to make up my novel hanger without departing from the spirit of my invention as defined in the appended claims.

I claim as my invention:

1. A hanger for carrying reciprocatory bodies compacted of a plurality of complete and incomplete flexible laminae bound together adjacent their ends, in which hanger some of the complete laminae are spaced from each other by the thickness of a single interposed incomplete lamina divided across the hanger each into two pieces with their adjacent edges separated a distance sufficient in defining a transverse space between the adjacent spaced complete laminae to provde a transverse zone of increased flexibility and approaching each other closely enough to cause the pieces of each incomplete lamina to partake substantially in the flexion of the adjacent complete laminae; the intervals between adjacent edges of the several incomplete laminae being of approximately the same length and in approximately the same position throughout the thickness of the hanger.

2. A hanger for carrying reciprocatory bodies in accordance with the definition of claim 1 in which the incomplete laminae are each additionally partially slotted longitudinally of the hanger.

3. A hanger for carrying reciprocatory bodies compacted of a plurality of complete and incomplete flexible laminae of approximately equal thickness bound together adjacent their ends, in which hanger some of the complete laminae are spaced from each other a distance not substantially greater than the thickness of each of the said complete laminae by interposed incomplete laminae each divided across the hanger into two pieces with their adjacent edges separated a distance sufficient in defining a transverse space between the adjacent spaced complete laminae to provide a transverse zone of increased flexibility and approaching each other closely enough to cause the pieces of each incomplete lamina to partake substantially in the flexion of the adjacent complete laminae; the intervals between adjacent edges of the several incomplete laminae being of approximately the same length and in approximately the same position throughout the thickness of the hanger.

EDWARD J. WINKLEMAN.